(12) United States Patent
Behne (10) Patent No.: US 9,015,188 B2
(45) Date of Patent: Apr. 21, 2015

(54) METHODS AND APPARATUS FOR MONITORING EXECUTION OF A DATABASE QUERY PROGRAM

(75) Inventor: Michael D. Behne, Fulshear, TX (US)

(73) Assignee: BMC Software, Inc., Houston, TX (US)

( * ) Notice: Subject to any disclaimer, the term of this patent is extended or adjusted under 35 U.S.C. 154(b) by 214 days.

(21) Appl. No.: 13/247,818

(22) Filed: Sep. 28, 2011

(65) Prior Publication Data

US 2013/0080462 A1 Mar. 28, 2013

(51) Int. Cl.
*G06F 17/30* (2006.01)

(52) U.S. Cl.
CPC .............................. *G06F 17/30463* (2013.01)

(58) Field of Classification Search
CPC ................................................ G06F 17/30463
USPC .............................................. 707/769; 713/1
See application file for complete search history.

(56) References Cited

U.S. PATENT DOCUMENTS

2006/0031200 A1* 2/2006 Santosuosso ...................... 707/3
2006/0080287 A1* 4/2006 Majd et al. .......................... 707/3

OTHER PUBLICATIONS

Heroix, "Using Enhanced Application Monitoring to Achieve Peak SQL Server Performance", White Paper, copyright 2007, 12 pages.
Bandarupalli, "Analyzing SQL Server Performance using Performance Monitor Counters", May 25, 2011, Document available at: http://www.techbubbles.com/sql-server/analyzing-sql-server-performance-using-performance-monitor-counters/.
Chan, "Oracle® Database Performance Tuning Guide 10g Release 2 (10.2)", B14211-03, Oracle, Mar. 2008, 474 pages.
Umer et al., "Optimizing query processing using selectivity-awareness in Wireless Sensor Networks", Elsevier, Computers, Environment and Urban Systems, vol. 33, 2009, pp. 79-89.
MSDN, "Monitoring Server Performance and Activity", SQL Server 2000, Sep. 13, 2010, Document Available at: http://msdn.microsoft.com/en-us/library/aa173860(v=SQL80).aspx.
"Hungry DBA.com: for DBAs who like food", Oct. 22, 2009, Document available at: http://hungrydba.com/sqlserver_monitoring.aspx.
Idera, "SQL diagnostic Manager", Solutions for Performance Monitoring, May 11, 2011, 2 pages.

* cited by examiner

*Primary Examiner* — Belix M Ortiz Ditren
(74) *Attorney, Agent, or Firm* — Brake Hughes Bellermann LLP (57) ABSTRACT

In one general aspect, a computer-readable storage medium can be configured to store instructions that when executed cause a processor to perform a process. The instructions can include instructions to receive, during a first portion of an execution of a main program including a database query program and based on a first configuration for monitoring the database query program, a parameter value representing performance of execution of the database query program. The instructions can include instructions to produce an indicator that a performance condition has been satisfied based, at least in part, on the parameter value, and instructions to trigger execution of a second configuration for monitoring the database query program during a second portion of the execution of the main program in response to the performance condition being satisfied.

20 Claims, 7 Drawing Sheets

METHODS AND APPARATUS FOR MONITORING EXECUTION OF A DATABASE QUERY PROGRAM

TECHNICAL FIELD

The subject matter of the present disclosure relates to database query program monitoring.

BACKGROUND

The monitoring and reporting of performance of execution of database query programs (e.g., structured query language (SQL) programs) can be valuable, but can also be resource-intensive. In particular, the resources consumed in monitoring highly efficient database query programs can be relatively high compared with the resources consumed in actually executing the highly efficient database query programs. Some known database query program performance monitors control the beginning and end of each execution of a database query program in order to collect information about the performance of the database query program during that execution. In some cases, the overhead of this collection process can outweigh the value of the information provided from the monitoring. Thus, a need exists for systems, methods, and apparatus to address the shortfalls of present technology and to provide other new and innovative features.

SUMMARY

In one general aspect, a computer-readable storage medium can be configured to store instructions that when executed cause a processor to perform a process. The instructions can include instructions to receive, during a first portion of an execution of a main program including a database query program and based on a first configuration for monitoring the database query program, a parameter value representing performance of execution of the database query program. The instructions can include instructions to produce an indicator that a performance condition has been satisfied based, at least in part, on the parameter value, and instructions to trigger execution of a second configuration for monitoring the database query program during a second portion of the execution of the main program in response to the performance condition being satisfied.

In another general aspect, an apparatus can include a monitoring module configured to receive an indicator of initiation of an execution cycle of a main program including a database query program configured to execute a plurality of times during the execution cycle of the main program, and a monitoring configuration manager configured to trigger monitoring of the database query program in response to the indicator of the initiation of the execution cycle of the main program. The monitoring configuration manager can be configured to terminate monitoring of the database query program during the execution cycle of the main program based on a parameter value related to the database query program satisfying a performance condition.

In yet another general aspect, a computer-readable storage medium can be configured to store instructions that when executed cause a processor to perform a process. The instructions can include instructions to trigger, at a beginning of each execution cycle of a plurality of executions of a main program including a plurality of database query programs, execution of a configuration for monitoring a database query program from the plurality of database query programs, and instructions to modify the configuration for monitoring of the database query program during at least a portion of the plurality of execution cycles of the main program.

The details of one or more implementations are set forth in the accompanying drawings and the description below. Other features will be apparent from the description and drawings, and from the claims.

DETAILED DESCRIPTION

Figure 1:
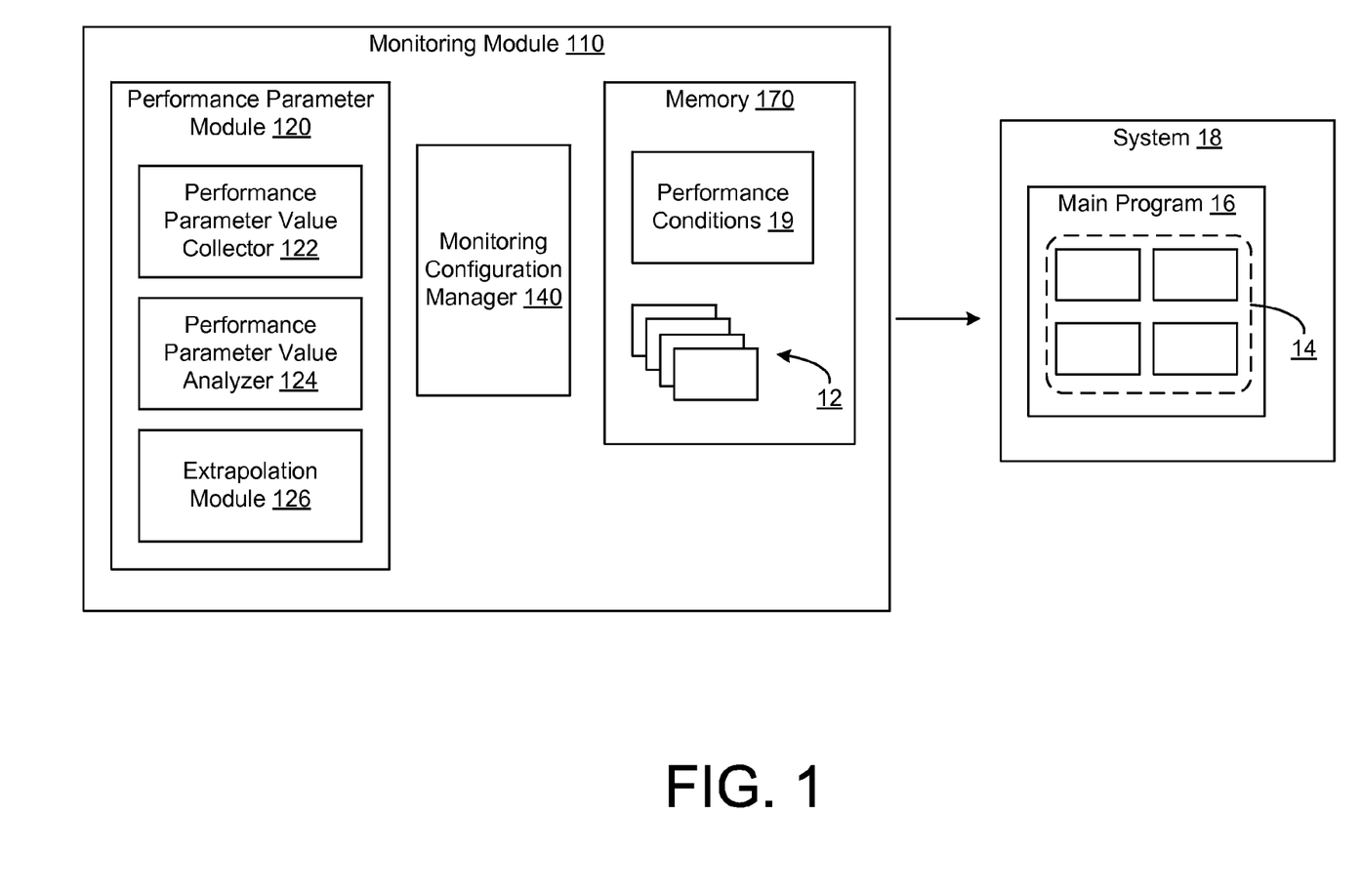
FIG. 1 is a diagram that illustrates a monitoring module, according to an embodiment.

FIG. 1 is a diagram that illustrates a monitoring module 110, according to an embodiment. The monitoring module 110 is configured to dynamically modify a configuration for monitoring (also can be referred to as a monitoring configuration) one or more structured database query programs 14 that can be included in a main program 16 associated with (e.g., for execution within) a system 18. In other words, monitoring of one of the database query programs 14 within the main program 16 can be modified during execution of the main program 16. For example, during a first execution of a database query program from the database query programs 14 within the main program 16, monitoring of the database query program 14 can be based on a first monitoring configuration. During a second execution of the database query program, monitoring of the database query program can be based on a second monitoring configuration different from the first monitoring configuration. Although not shown, in some embodiments, the main program 16 (or portions thereof) can be executed at, for example, one or more processors of the system 18.

In some embodiments, one or more of the database query programs 14 included in the main program 16 can each be executed multiple times within an execution cycle of the main program 16. In other words, the execution of the main program 16 can be performed during an execution cycle. In some embodiments, the main program 16 can be executed within the system 18 (e.g., a database system, a DB2 system for z/OS) several times during several execution cycles. In some embodiments, the main program 16 can be defined by the collection of database query programs 14 that can each be called for execution (e.g., independently called for execution) more than once during an execution cycle of the main program 16.

Each of the database query programs 14 can be any type of program configured to operate on (e.g., manage, access, modify), for example, one or more databases (e.g., relational databases, storage facilities) (not shown). For example, a database query program from the database query programs 14 can be configured to modify a structure of the database including rows and/or columns. In some embodiments, a database query program from the database query programs 14 can be configured to modify data stored within a database structure. In some embodiments, a database query program from the database query programs 14 can be configured to access data from one or more databases. In some embodiments, one or more of the database query programs 14 can include several different types of language elements including clauses, expressions, predicates, queries, statements, and/ or so forth.

The database query programs 14 shown in FIG. 1 can be any type of database query program such as a structured query language (SQL) program, a multidimensional expressions (MDX) program, a lightweight directory access protocol (LDAP) program, an XQuery program, an entity relationship role oriented language (ERROL) program, an XSQL program, and/or so forth. Although some the embodiments described herein are discussed in terms of an SQL program, the embodiments described herein can be applied to any type of database query program.

As shown in FIG. 1, the monitoring module 110 includes a monitoring configuration manager 140. The monitoring configuration manager 140 is configured to modify a configuration for monitoring one or more of the database query programs 14 during execution of the main program 16.

The monitoring configuration manager 140 can be configured to select one or more monitoring configurations 12 stored in a memory 170 for monitoring one or more of the database query programs 14. Various parameter values can be produced in response to the monitoring configurations 12. The parameter values can be an indicator of performance of one or more of the database query programs 14. In some embodiments, the parameter values can be referred to as performance parameter values. In some embodiments, the performance parameter values can include, for example, timeout values (e.g., a number of timeouts), deadlock values (e.g., a number of deadlocks), execution time values (e.g., a value specifying a duration of an execution), counter values (e.g., execution counter values), input/output (I/O) performance values (e.g., I/O times), central processing units (CPUs) performance values (e.g., CPU time, CPU usage), get page request values (e.g., a number of get page requests), elapsed time values (e.g., wait times, execution times of a database query program, CPU time), and/or so forth.

In some embodiments, one or more of the monitoring configurations 12 can be defined by monitoring configuration values. In some embodiments, the monitoring configuration values of one or more monitoring configurations 12 can specify parameter values (e.g., performance parameter values) that should be collected during monitoring of one or more of the database query programs 14. For example, in some embodiments, the monitoring configuration values can specify a rate of monitoring (e.g., a monitoring percentage, periodically (or randomly) monitoring a specified ratio of executions), monitoring timeout values to be monitored, monitoring deadlock values to be monitored, execution time values to be monitored, counter values (e.g., execution counters) to increment during monitoring, monitoring of input/output (I/O) performance, monitoring of CPU performance (e.g., CPU time, CPU usage), monitoring of get page request values, monitoring of elapsed time values (e.g., wait time, execution time of a database query program, CPU time), and/or so forth.

In some embodiments, one or more of the monitoring configurations 12 can include a predefined set of monitoring configuration values. In some embodiments, one or more monitoring configuration values included in one or more of the monitoring configurations 12 can be modified by the monitoring configuration manager 140. In some embodiments, one or more of the monitoring configurations 12 can be defined by the monitoring configuration manager 140 dynamically as one or more of the database query programs 14 are being monitored. In some embodiments, one or more of the monitoring configurations 12 can be customized by (e.g., defined by) a user and stored in the memory 170.

The performance parameter module 120 is configured to process one or more parameter values related to performance of the database query programs 14. The parameter value(s) processed by the performance parameter module 120 can be configured to trigger a change in configuration of monitoring implemented by the monitoring configuration manager 140. In other words, the monitoring configuration manager 140 can be configured to select one or more monitoring configurations 12 for monitoring one or more of the database query programs 14 based on parameter value(s) processed by the performance parameter module 120.

For example, monitoring of a database query program from the database query programs 14 can be performed based on a first monitoring configuration from the monitoring configurations 12. Several performance parameter values can be received (e.g., calculated, collected) based on the first monitoring configuration. Based on the performance parameter values calculated during the monitoring based on the first monitoring configuration, a second monitoring configuration from the monitoring configurations 12 can be selected and used to monitor the database query program. Additional performance parameter values can be received based on the second monitoring configuration.

In some embodiments, a configuration for monitoring one or more of the database query programs 14 can be modified so that monitoring can be more efficiently performed. For example, a configuration for monitoring one or more of the database query programs 14 can be reduced so that the consumption of resources (e.g., computing resources, bandwidth, etc.) associated with monitoring and/or delay caused by monitoring can be reduced or more efficiently used. The monitoring (e.g., monitoring rate, sampling rate, monitored performance parameter values) for a database query program from the database query programs 14 during a portion of an execution cycle of the main program 16 can be reduced if, for example, the performance the database query program exceeds a desirable level for a specified period of time during a prior portion of the execution cycle of the main program 16. In some embodiments, the monitoring (e.g., monitoring rate, monitored performance parameter values) for a database query program from the database query programs 14 during a portion of an execution cycle of the main program 16 can be increased if, for example, the performance the database query program falls below a desirable level for a specified period of time during a prior portion of the execution cycle of the main program 16.

Accordingly, monitoring can be dynamically bypassed based on recent performance history, adding intelligence to the selective monitoring such that the bypassed executions of one or more of the database query programs 14 are those that are operating in a desirable fashion and/or could influence the proportional overhead for monitoring in an undesirable fashion if monitored. In other words, a change in monitoring (or filtering of the monitoring) can be applied to database query program executions that are performing relatively well (e.g., performing efficiently, not causing application problems). In some embodiments, a number of executions associated with one or more of the database query programs 14 that are bypassed can be monitored (e.g., tracked, counted using a bypassed execution counter value).

The monitoring module 110 can be configured so that monitoring one or more of the database query programs 14 can be dynamically modified in an independent fashion. For example, monitoring of a first database query program from the database query programs 14 can be dynamically reduced so that monitoring of the first database query program can be more efficiently handled. Monitoring of a second database query program from the database query programs 14 may be maintained (e.g., may not be modified) because full and continuous monitoring of the second database query program may be desirable. Accordingly, the resource cost and effectiveness of the monitoring workload of the database query programs 14 can be handled in a desirable fashion by filtering monitoring of relatively efficient database query programs 14 while continuing to fully monitor other database query programs 14.

In some embodiments, the monitoring configuration manager 140 can be configured to compile, define, trigger execution of, and/or inject a monitoring module (e.g., a monitoring program, a stand-alone monitoring program) into at least a portion of one or more of the database query programs 14 to implement monitoring (e.g., one or more of the monitoring configurations 12). In some embodiments, performance parameter values that are already produced by the system 18 and/or the main program 16 can be selectively received (e.g., filtered) based one or more of the monitoring configurations 12. For example, only a subset of performance parameter values that are already produced by the system 18 and/or the main program 16 can be selectively received (and some ignored or discarded) based on one or more of the monitoring configurations 12. In some embodiments, for example, a monitoring configuration 12, after being initially implemented to receive a set of performance parameter values related to one of the database query programs 14 during a first portion of an execution cycle of the main program 16, can be modified during a second portion of the execution cycle to selectively receive only a portion of the set of performance parameter values.

Figure 2:
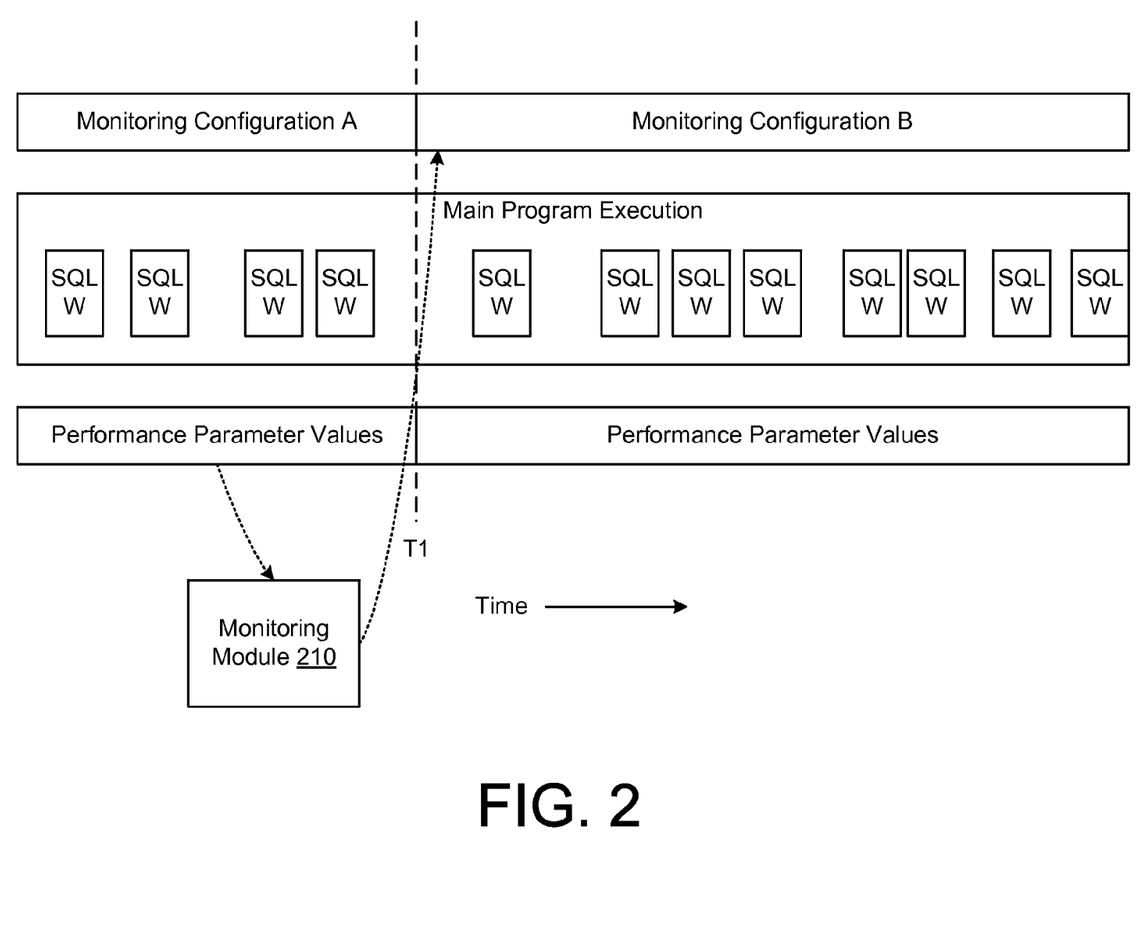
FIG. 2 is a diagram that illustrates changes in a monitoring configuration based on performance parameter values.

FIG. 2 is a diagram that illustrates changes in a monitoring configuration based on performance parameter values. In the diagram shown in FIG. 2, time is increasing to the right. Execution of an SQL program, SQL W, multiple times within a main program is shown in FIG. 2.

As shown in FIG. 2, monitoring of executions of SQL W before time T1 is performed based on monitoring configuration A. The performance parameter values before time T1 are produced based on the monitoring configuration A.

As depicted in FIG. 2, a monitoring module 210 (which can be similar to the monitoring module 110 shown in FIG. 1) is configured to trigger a change in monitoring of executions of SQL W based on the performance parameter values before time T1. Specifically, the monitoring module 210 is configured to trigger monitoring of executions of SQL W after time T1 based on monitoring configuration B. The triggering of the change in the monitoring configuration (from monitoring configuration A to monitoring configuration B) can be based on an analysis of the performance parameter values performed by the monitoring module 210. In some embodiments, the change in the monitoring can be triggered using, e.g., a binary bit value, a flag, an indicator, and/or so forth, stored in, for example, a memory (e.g., a database, table, and/or entry within a memory).

In some embodiments, monitoring performed based on the monitoring configuration B can be a reduction in monitoring (e.g., a reduced monitoring rate, reduced monitoring of executions, bypassing of monitoring, a reduced set of performance parameter values being monitored) compared with the monitoring performed based on monitoring configuration A. In some embodiments, a reduction in monitoring can include filtering performance parameter values so that certain performance parameter values that are produced are discarded (e.g. not stored).

For example, performance parameter values that may be produced by the system 18 shown in FIG. 1 may be filtered (e.g., discarded) by a parameter value collector (e.g., parameter value collector 122 shown in FIG. 1) based on one of the monitoring configurations 12. In some embodiments, a reduction in monitoring can result in more efficient use of computing resources (e.g., communication resources, bandwidth, processing unit computing cycles) because resources previously allocated to monitoring can be used to perform other types of processing and/or because delay caused by monitoring initiation/collection can be avoided.

In some embodiments, if monitoring of executions of a database query program during a main program is reduced when changing from a first monitoring configuration to a second monitoring configuration, the performance parameter values received (e.g., calculated, collected) during monitoring based on the first monitoring configuration can be extrapolated (e.g., extrapolated to define an estimate) to the time period during which the monitoring based on the second monitoring configuration is performed (during the reduced monitoring or non-monitoring time period). The extrapolation can be performed by, for example, an extrapolation module 126.

Specifically, performance parameter values received during a time period during which monitoring configuration A is being executed (during the time period before time T1) can be used to calculate performance parameter values for a time period during which monitoring configuration B is being executed (during the time period after time T1). The calculation of performance parameter values during a subsequent time period (e.g., a non-monitored time period) based on previously-received performance parameter values (e.g., performance parameter values for a monitored time period) can be referred to as extrapolation. In other words, the extrapolation of performance parameter values to a subsequent time period can be based on prior received performance parameter values (or a portion thereof). In some embodiments, the extrapolated performance parameter value can be based on less than all of the performance parameter values associated with an execution cycle. In some embodiments, the extrapolation of performance parameter values during a prior time period can be based on subsequently received performance parameter values (or a portion thereof).

In some embodiments, the performance parameter values used to calculate extrapolated performance parameter values can be referred to as original performance parameter values. In some embodiments, original performance parameter values and/or extrapolated performance parameter values can be used to calculate statistics for a database query program (e.g., SQL W).

In some embodiments, the first execution of any particular database query program (such as SQL W) may have performance characteristics that are different from the performance characteristics of subsequent executions of the same database query program. For example, a database query program, when initially being executed upon start-up of a main program during an execution cycle (or at the beginning of a series of execution cycles), may execute over a duration that is relatively long compared with subsequent executions of the main program during the same execution cycle.

In some embodiments, the difference between an initial execution of a database query program and subsequent executions can be caused by initial caching, initialization of related programs, activating libraries related to the initial execution, etc. related to the initial execution. In some embodiments, the difference between an initial execution of a database query program and subsequent executions can be caused by, for example, a buffer pool hit ratio. Specifically, a first execution of a database query program can issue (e.g., trigger) relatively high levels of synchronous I/O activity and/or can consume relatively long computing times to pull data into the buffer pool. Subsequent executions of the database query program can benefit from the data already in the buffer pool.

In some embodiments, an extrapolated performance parameter value can be calculated based on the following formula to account for effects (e.g., undesirable effects) from an initial execution of a database query program:

$$EPPV=MPPV1+(TMPPV*(ME+BE-1)/(ME-1)),$$

where EPPV is an extrapolated performance parameter value, MPPV1 is a monitoring performance parameter value from a first execution (e.g., an initial execution), TMPPV is a total monitored performance parameter value from subsequent executions (e.g., subsequent to the initial execution), ME is a total number of monitored executions, BE is a total number of bypassed executions. In some embodiments, an extrapolated performance parameter value can be calculated in a different fashion to account for effects from an initial execution of a database query program. In some embodiments, extrapolation can be performed for an execution cycle when a duration between the execution cycle and any prior execution cycle exceeds a threshold period of time.

Referring back to FIG. 1, the performance parameter module 120 includes a performance parameter value collector 122. The performance parameter value collector 122 is configured to receive (e.g., collect, access) one or more performance parameter values. The performance parameter values can be produced (e.g., accessed, calculated by the performance parameter value collector 122) based on one or more of the monitoring configurations 12. In some embodiments, the parameter value collector 122 can be referred to as a post-execution collector.

In some embodiments, one or more of the performance parameter values can be received at the performance parameter value collector 122 through an interface with, for example, the main program 16. In some embodiments, the system 18 (or program associated with the system 18) can be configured to log various values (which can be performance parameter values) based on one or more of the monitoring configurations 12 that can later be accessed by the performance parameter value collector 122. In some embodiments, performance parameter values logged by the system 18 can be filtered (e.g., received in a selective fashion) by the performance parameter value collector 122 based on one or more of the monitoring configurations 12. In some embodiments, the performance parameter value collector 122 can be configured to record whether or not an execution associated with a database query program from the database query programs 14 exceeded any performance thresholds (which can be specified within one or more of performance conditions 19).

In some embodiments, one or more performance parameter values can be calculated based on multiple performance parameter values. For example, a performance parameter value can be an average of several performance parameter values. Although not shown in FIG. 1, in some embodiments, one or more performance parameter values can be stored by the performance parameter value collector 122 in the memory 170 (e.g., within a database of the memory 170).

The performance parameter module 120 includes a performance parameter value analyzer 124 configured to analyze one or more performance parameter values after the performance parameter values have been received by (e.g., accessed by) the performance parameter value collector 122. The performance parameter value analyzer 124 can be configured to analyze the performance parameter values based on one or more performance conditions 19 stored in the memory 170. Specifically, the performance parameter value analyzer 124 can be configured to determine (e.g., calculate) whether or not one or more of the performance conditions 19 is satisfied. In response to one or more performance conditions 19 being satisfied, the performance parameter value analyzer 124 can be configured to trigger the monitoring configuration manager 140 to modify monitoring of one or more of the database query programs 14 (based on one or more of the monitoring configurations 12). The performance parameter value analyzer 124 can be configured to produce an indicator that one or more of the performance conditions 19 have been satisfied, and can be configured to send the indicator to the monitoring configuration manager 140.

In some embodiments, one or more of the performance conditions 19 can be based on any type of performance parameter value. In some embodiments, one or more of the performance conditions 19 can include threshold values, specific actions to be triggered (such as a change in a monitoring configuration) in response to threshold values being exceeded (or not being exceeded), various types of Boolean conditions, and/or so forth. For example, a performance condition from the performance conditions 19 can be based on a duration of execution of one of the database query programs 14, a number of times of execution of one of the database query programs 14, and so forth. In response to the performance condition being satisfied (or unsatisfied), the performance condition can include an indicator that monitoring of the database query program is to be modified in a specific manner.

As a specific example, the performance parameter value analyzer 124 can be configured to receive a performance parameter value indicating that a database query program from the database query programs 14 has executed more than a threshold number of times indicated within one of the performance conditions 19. In response to the threshold number specified within the performance condition 19 being exceeded, the performance parameter value analyzer 124 can be configured to trigger the monitoring configuration manager 140 to modify further monitoring of the database query program (based on one or more of the monitoring configurations 12). In some embodiments, modification of the monitoring of the database query program can also be specified within the performance condition 19.

As another example, the performance parameter value analyzer 124 can be configured to receive a performance parameter value indicating a duration of execution of a database query program from the database query programs 14. The performance parameter value analyzer 124 can be configured to determine that the duration exceeds a threshold value for the execution duration of the specific database query program specified within one of the performance conditions 19. In response to the threshold value within the performance condition 19 being exceeded, the performance parameter value analyzer 124 can be configured to trigger the monitoring configuration manager 140 to modify further monitoring of the database query program (based on one or more of the monitoring configurations 12). In some embodiments, modification of the monitoring of the database query program can also be specified within the performance condition 19.

As yet another example, the performance parameter value analyzer 124 can be configured to receive a performance parameter value indicating that execution of a database query program from the database query programs 14 is below a threshold value specified within one of the performance conditions 19. The performance parameter value analyzer 124 can be configured to trigger the monitoring configuration manager 140 to maintain further monitoring of the database query program using one of the monitoring configurations 12. The monitoring can be maintained because the threshold value within the performance condition 19 has not been exceeded.

In some embodiments, the performance parameter value analyzer 124 can be configured to further process performance parameter values that are produced based on one or more of the monitoring configurations 12. For example, a set of performance parameter values can be produced based on one of the monitoring configurations 12. The set of performance parameter values can be received by the performance parameter value collector 122, and the performance parameter value analyzer 124 can be configured to calculate one or more performance parameter values (e.g., an average performance parameter value) based on the set of performance parameter values. The performance parameter value analyzer 124 can be configured to determine whether or not one or more of the performance conditions 19 have been satisfied (or unsatisfied) based on the performance parameter value(s) calculated by the performance parameter value analyzer 124.

In some embodiments, the performance conditions 19 can be based on a combination of performance parameter values. In some embodiments, the combination can be any type of Boolean combination (e.g., an AND combination, an OR combination). For example, a change in monitoring rate (e.g., sampling rate) may be implemented in response to a performance threshold (e.g., a CPU time) and a number of executions (e.g., a number of executions of an SQL program) being exceeded. As another example, a change in monitoring rate may be implemented in response to either a performance threshold (e.g., a CPU time) or a number of executions (e.g., a number of executions of an SQL program) being exceeded.

As another specific example, the performance parameter value collector 122 can be configured to record whether or not an execution associated with a database query program from the database query programs 14 exceeded performance thresholds (e.g., CPU time) and/or a number of executions (e.g., a number of executions of an SQL program) (which can be specified within one or more of performance conditions 19). The performance thresholds and/or the number of executions can be stored in an entry associated with the database query program. An indicator (e.g., a flag) associated with the performance thresholds and/or the number of executions can be configured to trigger a change in monitoring (e.g., a termination of monitoring). In some embodiments, the performance conditions 19 can be based on any combination of performance parameter values including, for example, timeout values (e.g., a number of timeouts), deadlock values (e.g., number of deadlocks), execution time values (e.g., a duration of an execution), counter values (e.g., execution counter values), input/output (I/O) performance values (e.g., I/O times), central processing units (CPUs) performance values (e.g., CPU time, CPU usage), get page request values (e.g., a number of get page requests), elapsed time values (e.g., wait times, execution times of a database query program, CPU time), and/or so forth.

In some implementations, the monitoring module 110 can be configured to operate at a host device. In such implementations, the monitoring module 110 can be configured to access the system 18 through a network. In some embodiments, the functionality of the monitoring module 110 can be called and/or executed on an on-demand basis. In some implementations, the monitoring module 110 can function as a background application operating in conjunction with the system 18. In some implementations, the monitoring module 110 can function as an application (or service) that can be accessed via an application programming interface (API).

The monitoring module 110 can be, or can include, any type of hardware and/or software configured to access the system 18 (and/or the programs executing a system 18). In some implementations, one or more portions of the components shown in the monitoring module 110 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the monitoring module 110 can be, or can include, a software module configured for execution by at least one processor (not shown). In some implementations, the functionality of the components can be included in different modules and/or different components than those shown in FIG. 1.

For example, although not shown, the functionality of the performance parameter value analyzer 124 can be included in the monitoring configuration manager 140. As another example, the performance parameter value analyzer 124 can be included in a different module than the performance parameter value analyzer 124, or divided into several different modules.

Although not shown, in some implementations, the monitoring module 110 (or portions thereof) can be configured to operate within, for example, a data center (e.g., a cloud computing environment), a computer system, one or more server/host devices, and/or so forth. In some implementations, the monitoring module 110 (or portions thereof) and/or the system 18 (or portions thereof) can be configured to operate within a network. Thus, the monitoring module 110 (or portions thereof) and/or the system 18 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The monitoring module 110 and/or the system 18 can be configured to operate based on one or more platforms (e.g., one or more similar or different platforms) that can include one or more types of hardware, software, firmware, operating systems, runtime libraries, and/or so forth. In some implementations, the monitoring module 110 and/or the system 18 can represent a cluster of devices (e.g., a server farm). In such an implementation, the functionality and processing of the monitoring module 110 and/or the system 18 can be distributed to several devices of the cluster of devices.

Figure 3:
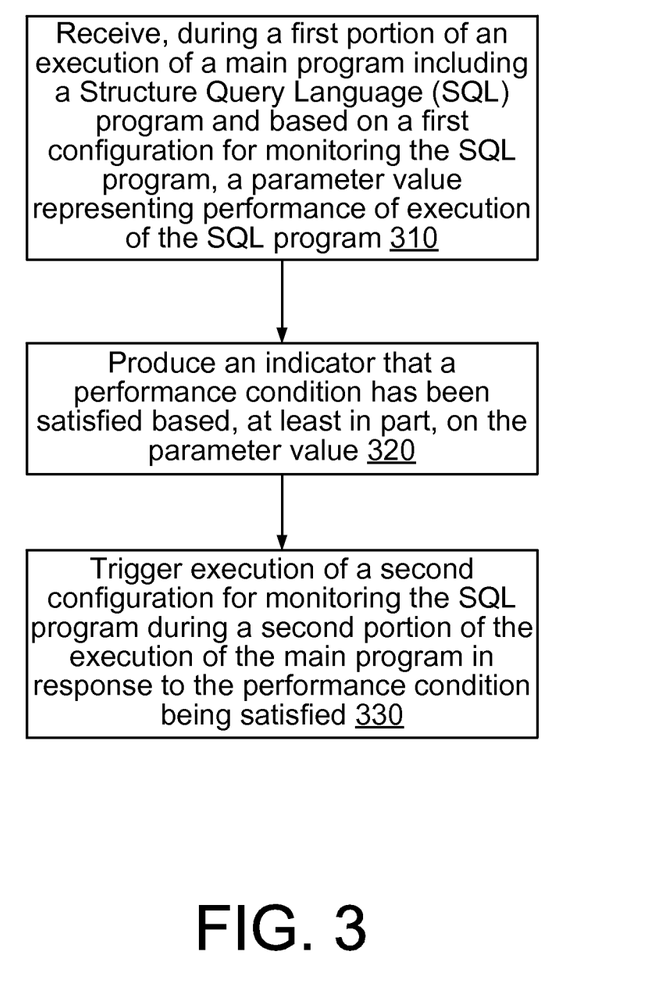
FIG. 3 is a flowchart that illustrates a method for monitoring a database query program.

FIG. 3 is a flowchart that illustrates a method for monitoring a database query program. In some embodiments, at least a portion of the method illustrated in FIG. 3 can be performed by a monitoring module such as the monitoring module 110 shown in FIG. 1.

As shown in FIG. 3, a parameter value representing performance of execution of the database query program is received during a first portion of an execution of a main program including a database query program and based on a first configuration for monitoring the database query program (block 310). The parameter value representing the performance of execution of the database query program can be received by, for example, the performance parameter value collector 122 shown in FIG. 1. In some embodiments, the first configuration for monitoring the database query program can be triggered by, for example, the monitoring configuration manager 140 shown in FIG. 1. In some embodiments, the database query program can be an SQL program.

An indicator that a performance condition has been satisfied based, at least in part, on the parameter value is produced (block 320). In some embodiments, the indicator that a performance condition has been satisfied based on parameter value can be produced by, for example, the performance parameter value analyzer 124 shown in FIG. 1. In some embodiments, the performance condition can be one or more of the performance conditions 19 shown in FIG. 1. In some embodiments, the performance condition can be satisfied (or unsatisfied) based on a count value (e.g., a count value representing a number of executions of a database query program), an execution time value, and/or so forth.

Execution of a second configuration for monitoring the database query program during a second portion of the execution of the main program in response to the performance condition being satisfied is triggered (block 330). In some embodiments, execution of the second configuration for monitoring the database query program can be triggered by, for example, the monitoring configuration manager 140 shown in FIG. 1. In some embodiments, the first configuration for monitoring the database query program and/or the second configuration for monitoring the database query program can be, for example, one or more of the monitoring configurations 12 shown in FIG. 1. In some embodiments, the first portion of the execution of the main program can have a different duration than the second portion of the execution of the main program.

In some embodiments, the database query program can be one of several database query programs within the main program. In some embodiments, the database query program can be one of several database query programs that are independently monitored based on one or more monitoring configurations. The monitoring configurations associated with the several database query programs can be dynamically modified using, for example, the monitoring module 110 shown in FIG. 1.

Figures 4A, 4B:
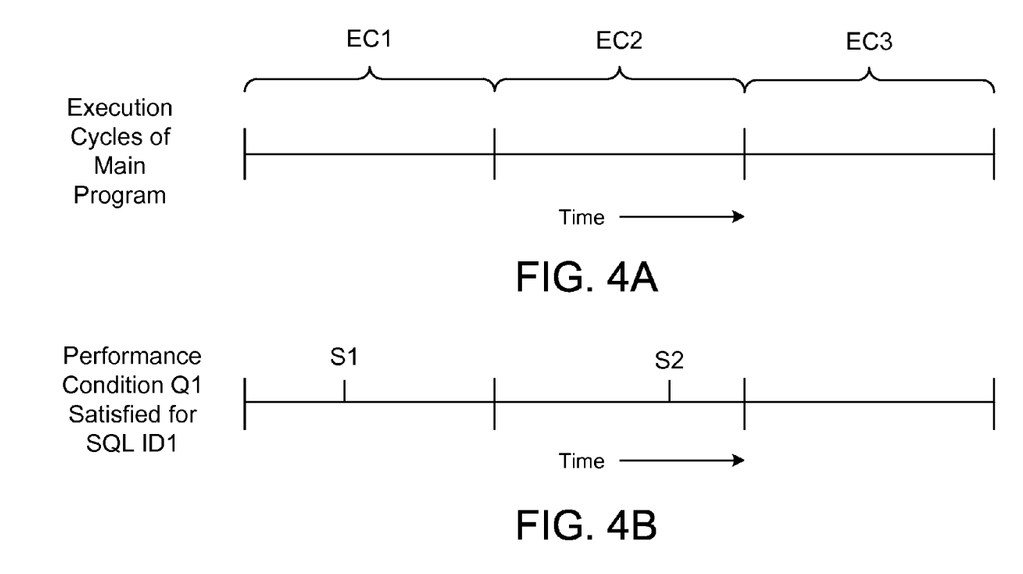
FIGS. 4A through 4F are diagrams that illustrate monitoring of structure query language (SQL) programs.
Figure 4C:
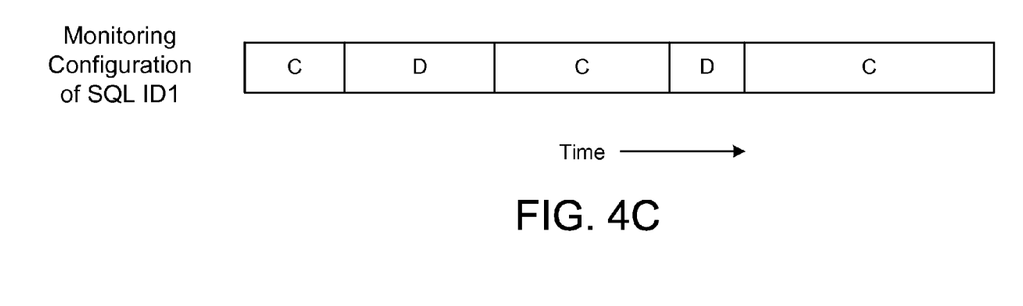
Figure 4D:
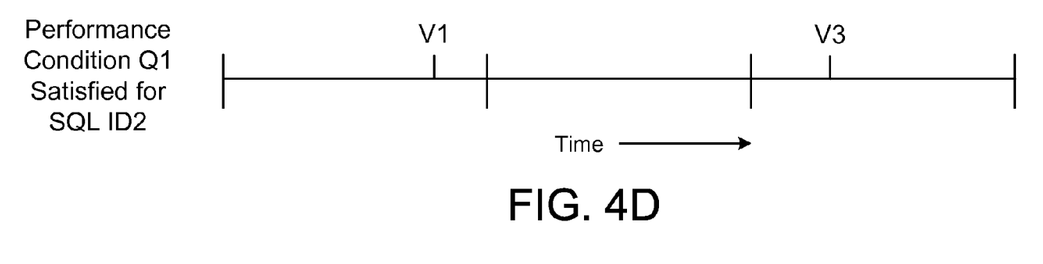
Figure 4E:
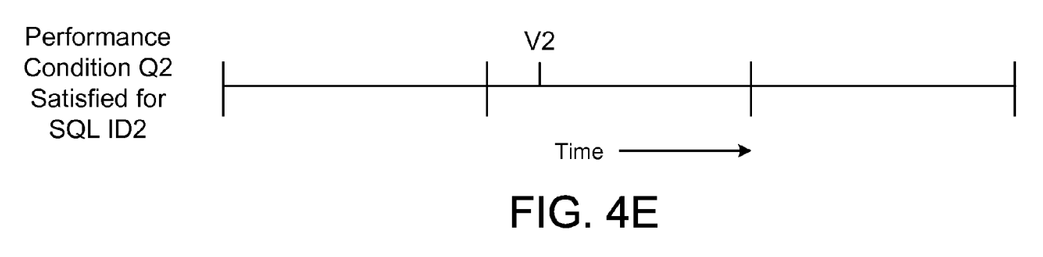
Figure 4F:
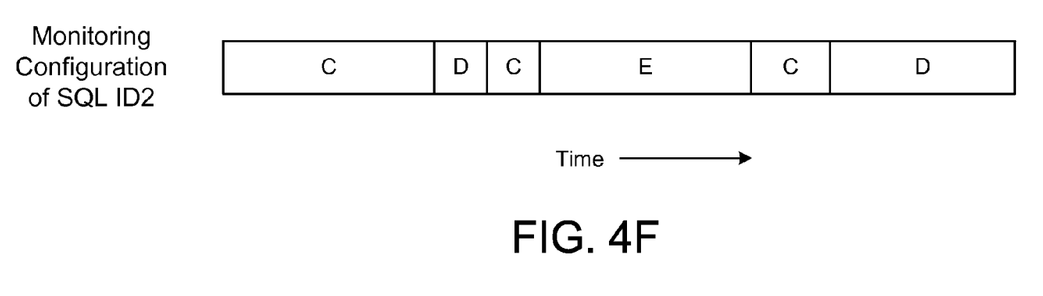

FIGS. 4A through 4F are diagrams that illustrate monitoring of SQL programs. The SQL programs include SQL program ID1 and SQL program ID2. In the diagrams, time is increasing to the right. In this embodiment, FIGS. 4B and 4C are associated with monitoring of SQL program ID1, and FIGS. 4D through 4F are associated with monitoring of SQL program ID2.

Several execution cycles—execution cycles EC1 through EC3—of a main program are shown in FIG. 4A. In this embodiment, a duration of each of the execution cycles is the same. In some embodiments, the durations of the execution cycles can be different. For example, execution cycle EC1 of the main program can have a duration that is different than a duration of the execution cycle EC2 of the main program. In some embodiments, the main program can be a program executing at a system (e.g., system 18 shown in FIG. 1).

Although not explicitly shown in FIG. 4A, in some embodiments, the SQL programs ID1 and ID2 can be executed multiple times during the execution cycles associated with the main program. For example, SQL program ID1 can be executed hundreds or thousands of times during execution cycle EC1 of the main program.

As shown in FIG. 4B, a performance condition Q1 is satisfied at time S1 and at time S2 (during execution cycles EC1 and EC2, respectively) based on performance parameter values associated with SQL program ID1. Performance condition Q1 is not satisfied during execution cycle EC3 of the main program.

Although not shown in FIG. 4B, multiple performance conditions can be satisfied based on performance parameter values associated with SQL program ID1. In some embodiments, a performance condition satisfied at time S1 can be different than a performance condition satisfied at time S2. For example, a first performance condition can be satisfied based on performance parameter values associated with SQL program ID1 during execution cycle EC1, and a second performance condition can be satisfied based on performance parameter values associated with SQL program ID1 during execution cycle EC2. In some embodiments, the satisfying of the performance condition at times S1 and S2 can be determined (e.g., calculated) by a performance parameter value analyzer (e.g., performance parameter value analyzer 124 shown in FIG. 1).

FIG. 4C is a diagram that illustrates monitoring configurations for monitoring SQL program ID1 during the execution cycles EC1 through EC3. As shown in FIG. 4C, the monitoring configuration C is used to monitor (e.g., is triggered for monitoring of) SQL program ID1 during a first portion (e.g., a beginning portion) of the execution cycle EC1. In response to the performance condition Q1 being satisfied at time S1 (shown in FIG. 4B), monitoring configuration D is triggered for monitoring of the SQL program ID1 during a second portion (e.g., an end portion) of the execution cycle EC1.

As shown in FIG. 4C, the monitoring configuration C is used to monitor (e.g., is triggered for monitoring of) SQL program ID1 during a first portion (e.g., a beginning portion) of the execution cycle EC2. Similar to the monitoring during the execution cycle EC1, in response to the performance condition Q1 being satisfied at time S2 (shown in FIG. 4B), monitoring configuration D is triggered for monitoring of the SQL program ID1 during a second portion (e.g., an end portion) of the execution cycle EC2.

During execution cycle EC3, monitoring of SQL program ID1 is only performed based on monitoring configuration C. In other words, the monitoring configuration of the SQL program ID1 during execution cycle EC3 is not modified. The monitoring configuration of the SQL program ID1 during execution cycle EC3 is not modified because the performance condition Q1 is not satisfied during the execution cycle EC3.

As shown in FIG. 4C, at the beginning of each of the execution cycles EC1 through EC3, monitoring is performed based on monitoring configuration C. Accordingly, in some embodiments, monitoring of the main program can be reset to a particular configuration (e.g., reset using an indicator or a flag) at the beginning of each of the execution cycles EC1 through EC3. In some embodiments, the monitoring configuration used at the beginning of each of the execution cycles can be referred to as a reset monitoring configuration. In the embodiment illustrated in connection with SQL program ID1, modification of the monitoring configuration from monitoring configuration C is triggered only when the performance condition Q1 is satisfied (e.g., satisfied at times S1 and S2 shown in FIG. 4B). In some embodiments, monitoring for an initial execution cycle from a series of execution cycles (e.g., execution cycle EC1 from the series of execution cycles EC1 through EC3) can be monitored with a reset monitoring configuration different then a reset monitoring configuration for the remaining execution cycles in the series of execution cycles.

Also, as shown in FIG. 4C, a duration of monitoring of the SQL program ID1 based on monitoring configuration C is different during each of the execution cycles EC1 through EC3. Specifically, a duration of monitoring based on monitoring configuration C during execution cycle EC1 is shorter than a duration of monitoring based on monitoring configuration C during execution cycle EC2 or execution cycle EC3.

Also, in this embodiment, monitoring based on monitoring configuration C during execution cycle EC3 is not modified (e.g., not modified to monitoring configuration D). Accordingly, monitoring based on monitoring configuration C will continue (e.g., will be maintained) during an execution cycle after execution cycle EC3.

The differences in duration of the monitoring based on monitoring configuration C within each of the execution cycles can be a function of when the performance condition Q1 is satisfied based on performance parameter values associated with monitoring of SQL program ID1. For example, if the performance condition Q1 is related to a specified number of times of execution (which can also be referred to as an efficiency filter count) of SQL program ID1 within each of the execution cycles EC1 through EC3, FIGS. 4A and 4B collectively illustrate that the number of times for execution of SQL program ID1 can vary during each of the execution cycles EC1 through EC3. Accordingly, the monitoring of the SQL program ID1 may be modified at different times (or not at all) during each of the execution cycles EC1 through EC3.

In some embodiments, the change of monitoring from the monitoring configuration C to the monitoring configuration D can be a change in monitoring rate (e.g., an increase in monitoring, a decrease in monitoring). For example, the monitoring configuration C can be a full monitoring configuration where monitoring is performed for a specified set of performance parameter values for each execution of the SQL program ID1. The monitoring configuration D can be a monitoring configuration where monitoring is performed for only a subset of the executions of the SQL program ID1 and/or for only a subset of performance parameter values. In some embodiments, the monitoring configuration D can be a monitoring configuration where no monitoring is performed for any execution of the SQL program ID1 and/or for any performance parameter values. In other words, the monitoring configuration D can be a configuration where monitoring is terminated (or a portion thereof is terminated).

FIG. 4D illustrates performance condition Q1 being satisfied at time V1 and at time V3 (during execution cycles EC1 and EC3, respectively) based on performance parameter values associated with SQL program ID2. Performance condition Q1 is not satisfied during execution cycle EC2.

FIG. 4E illustrates a performance condition Q2 being satisfied at time V during execution cycle EC2 based on performance parameter values associated with SQL program ID2. Performance condition Q2 is not satisfied during execution cycle EC1 or EC3. In some embodiments, the satisfying of the performance condition Q1 and Q2 can be determined (e.g., calculated) by a performance parameter value analyzer (e.g., performance parameter value analyzer 124 shown in FIG. 1).

FIG. 4F is a diagram that illustrates monitoring configurations for monitoring SQL program ID2 during the execution cycles EC1 through EC3. As shown in FIG. 4F, the monitoring configuration C is used to monitor (e.g., is triggered for monitoring of) SQL program ID2 during a first portion (e.g., a beginning portion) of the execution cycles EC1 and EC3. In response to the performance condition Q1 being satisfied at time V1 and time V3 (shown in FIG. 4D), monitoring configuration D is triggered for monitoring of the SQL program ID1 during a second portion (e.g., an end portion) of the execution cycles EC1 and EC3.

During execution cycle EC2, the monitoring configuration C is used to monitor (e.g., is triggered for monitoring of) SQL program ID2 during a first portion (e.g., a beginning portion) of the execution cycle EC2. In response to the performance condition Q2 being satisfied at time V2 (shown in FIG. 4E), monitoring configuration E is triggered for monitoring of the SQL program ID2 during a second portion (e.g., an end portion) of the execution cycle EC2.

As illustrated by the figures in connection with SQL program ID2, different monitoring conditions can be triggered by different performance conditions. In this embodiment associated with SQL program ID2, monitoring is performed based on monitoring configuration C at the beginning of each of the execution cycles EC1 through EC3. In some embodiments, monitoring may be initiated for each of the execution cycles EC1 through EC3 (for SQL program ID1 or for SQL program ID2) based on a monitoring configuration different from monitoring configuration C.

Figure 5:
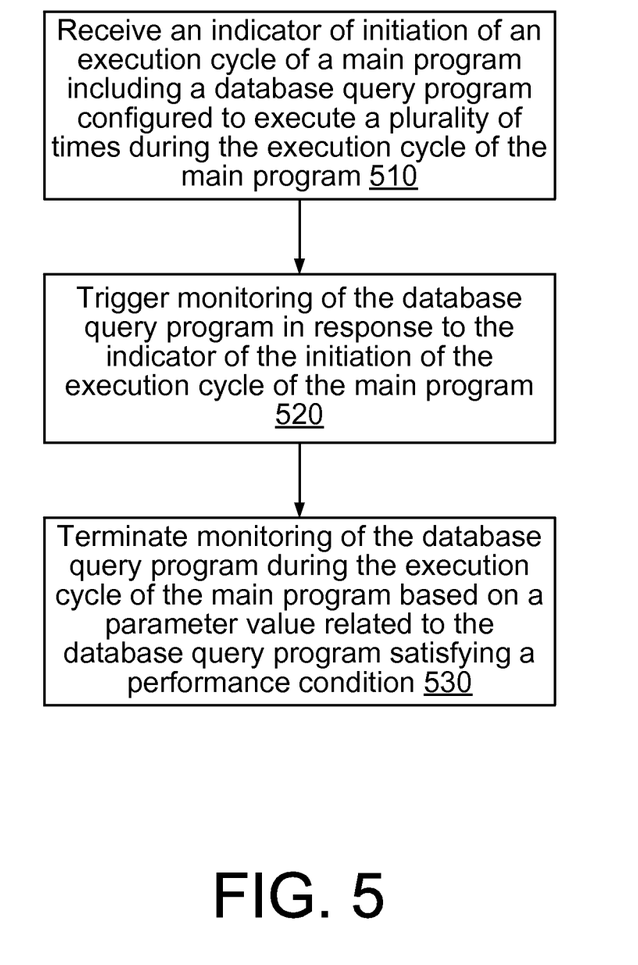
FIG. 5 is a flowchart that illustrates another method for monitoring a database query program.

FIG. 5 is a flowchart that illustrates another method for monitoring a database query program. In some embodiments, at least a portion of the method illustrated in FIG. 5 can be performed by a monitoring module such as the monitoring module 110 shown in FIG. 1.

An indicator of initiation of an execution cycle of a main program including a database query program configured to execute a plurality of times during the execution cycle of the main program is received (block 510). The indicator of initiation of the execution cycle of the main program can be received at the monitor module 110 shown in FIG. 1 or at the performance parameter value collector 122 shown in FIG. 1. In some embodiments, the database query program can be one of many database query programs included in the main program. In some embodiments, the database query program can be an SQL program.

Monitoring of the database query program is triggered in response to the indicator of the initiation of the execution cycle of the main program (block 520). In some embodiments, the monitoring of the database query program can be triggered by, for example, the monitoring configuration manager 140 shown in FIG. 1. The monitoring can be based on one or more monitoring configurations (e.g., monitoring configurations 12 shown in FIG. 1).

Monitoring of the database query program is terminated during the execution cycle of the main program based on a parameter value related to the database query program satisfying a performance condition (block 530). In some embodiments, parameter value can be a parameter value representing performance of execution of the database query program and can be received by, for example, the performance parameter value collector 122 shown in FIG. 1. In some embodiments, the termination of the monitoring can be triggered by, for example, the monitoring configuration manager 140 shown in FIG. 1. In some embodiments, the performance condition can be one or more of the performance conditions 19 shown in FIG. 1. In some embodiments, the performance condition can be satisfied based on a count value, an execution time value, and/or so forth.

Figure 6A:
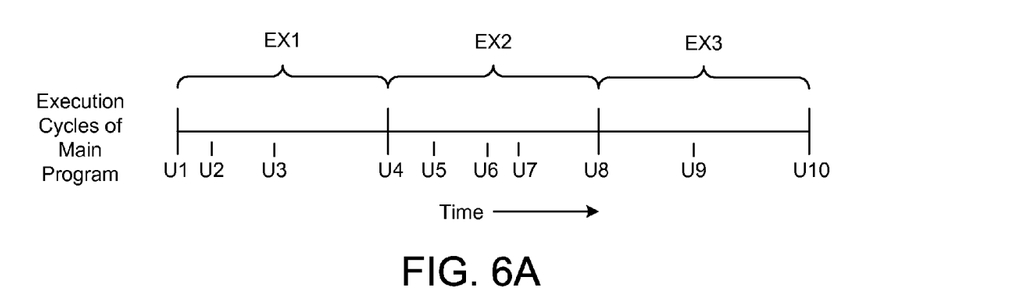
FIGS. 6A through 6C are diagrams that illustrate monitoring of another SQL program.
Figure 6B:
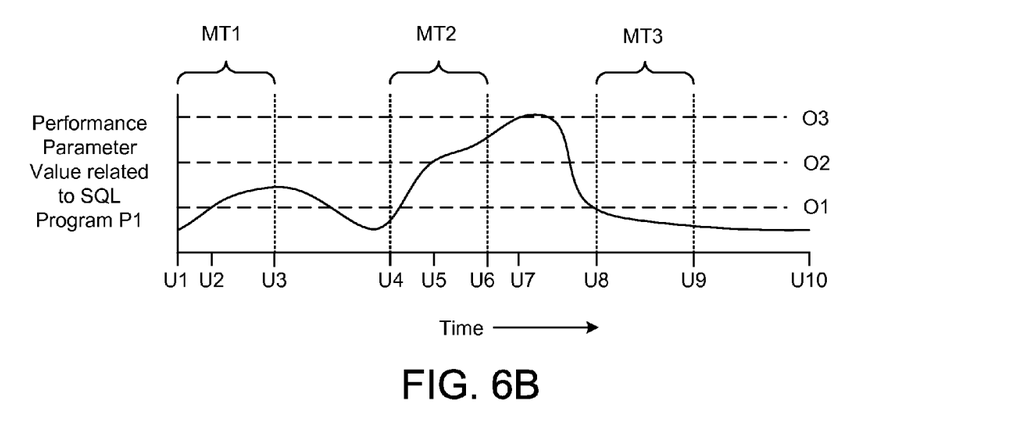
Figure 6C:
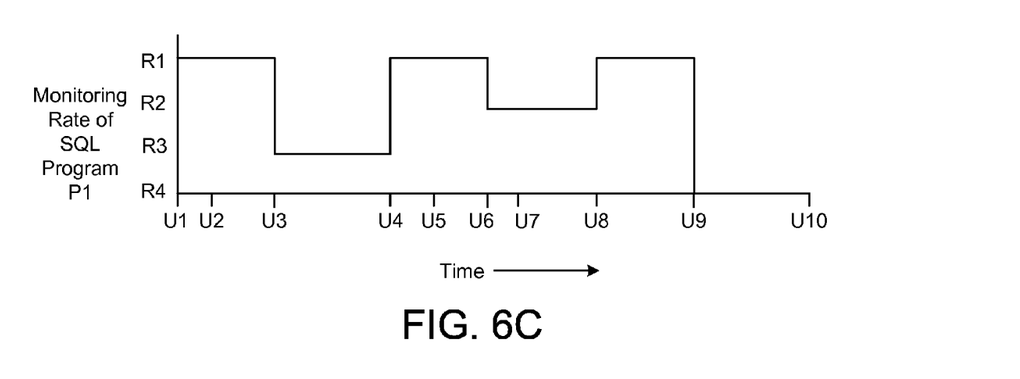

FIGS. 6A through 6C are diagrams that illustrate monitoring of an SQL program P1. In the diagrams, time is increasing to the right. Several execution cycles—execution cycles EX1 through EX3—of a main program are shown in FIG. 4A. In this embodiment, a duration of each of the execution cycles is the same. In some embodiments, the durations of the execution cycles can be different. For example, execution cycle EX1 of the main program can have a duration that is different than a duration of the execution cycle EX2 of the main program. In some embodiments, the main program can be a program executing at a system (e.g., system 18 shown in FIG. 1).

Although not explicitly shown in FIG. 6A, in some embodiments, the SQL programs P1 can be executed multiple times during the execution cycles associated with the main program. For example, SQL program P1 can be executed hundreds of times during execution cycle EX1 of the main program.

As shown in FIG. 6B, a performance parameter value (e.g., a CPU time) related to SQL program P1 is shown with respect to several threshold values—threshold values O1 through O3. The threshold values O1 through O3 can be defined within one or more performance conditions. Monitoring time periods MT1 through MT3 (which have the same duration) are shown in FIG. 6B.

In some embodiments, the durations of the monitoring time periods can be different. For example, monitoring time period MT1 can have a duration that is different than a duration of the monitoring time period MT2. In some embodiments, one or more of the monitoring time periods MT1 through MT3 can be defined by (e.g., determined) based on a number of executions if portions of the main program (e.g., a number of executions of the SQL program P1 and other SQL programs included in the main program).

As shown in FIG. 6B, the performance parameter value associated with SQL program P1 exceeds threshold value O1 at approximately time U2 during time period MT1, exceeds a threshold value O2 at approximately time U5 during time period MT2, and exceeds threshold value O3 at approximately time U7 (between time period MT2 and time period MT3). None of the threshold values O1 through O3 are exceeded during time period MT3.

In this embodiment, a monitoring rate (e.g., a sampling rate, a percentage of monitoring) shown in FIG. 6C is modified in response to the performance parameter values exceeding one or more of the threshold values O1 through O3 within the monitoring time periods MT1 through MT3 shown in FIG. 6B. In this embodiment, the monitoring rates include monitoring rates R1 through R4 (which can be increasing monitoring rates or decreasing monitoring rates). As shown in FIG. 6C, the monitoring rate is reset to monitoring rate R1 (which can be referred to as a reset monitoring rate) at the beginning of each of the execution cycles. In this embodiment, the monitoring rate is adjusted according to the following table where performance parameter value is abbreviated as PPV:

| Performance Condition | Monitoring Rate |
|---|---|
| PPV < O1 | R4 |
| O2 > PPV ≥ O1 | R3 |
| O3 > PPV ≥ O2 | R2 |
| PPV ≥ O3 | R1 |

In accordance with the table shown above, in response to the performance parameter value exceeding the threshold value O1 (but remaining below threshold value O2) at approximately time U2 during time period MT1, the monitoring rate of SQL program P1 is changed from a monitoring rate of R1 to a monitoring rate of R3 starting at approximately time U3 (after the monitoring time period MT2). Because the performance parameter value remains below threshold value O1 during time period MT3, the monitoring rate of SQL program P1 is changed from a monitoring rate of R1 to a monitoring rate of R4 starting at approximately time U9 (after the monitoring time period MT3).

In response to the performance parameter value exceeding a threshold value O2 (but remaining below threshold value O3) at approximately time U5 during time period MT2, the monitoring rate of SQL program P1 is changed from a monitoring rate of R1 to a monitoring rate of R2 starting at approximately time U6 (after the monitoring time period MT2). In this embodiment, the monitoring rate after the monitoring time period MT2 is defined based on the highest threshold value exceeded based on the performance parameter value. Accordingly, even though the threshold value O1 is exceeded during the monitoring time period MT2, the monitoring rate of R2 is set based on the later increase of the performance parameter value beyond a threshold value O2.

Although the table shown above includes a performance condition based on threshold values O1 through O3 and the performance parameter value. In some embodiments, a monitoring rate can be changed based on a combination of performance conditions (which can each include one or more threshold values) and/or a combination of performance parameter values. In some embodiments, the monitoring rate can be changed based on the threshold values O1 through O3 only if a specified number of executions (e.g., a specified number of executions of the SQL program P1) have been exceeded (within one or more of the monitoring time periods MT1 through MT3).

In this embodiment, because the performance parameter value does not exceed the threshold value O3 until outside of the monitoring time period MT2, the monitoring rate is not further adjusted at approximately time U7. Although not shown in FIGS. 6A through 6C, a monitoring module can be configured to further adjust the monitoring rate (e.g., adjust the monitoring rate to monitoring rate R1) based on the threshold value O3 being exceeded at approximately time U7.

In some embodiments, the monitoring rate can be dynamically adjusted as different thresholds are crossed. For example, as the performance parameter value increases beyond certain threshold values (e.g., increases beyond a threshold value O2), the monitoring rate can be changed (e.g., changed to monitoring rate R2, changed to a reduced monitoring rate). Also as a performance parameter value decreases below certain threshold values (e.g., falls below threshold value O2), the monitoring rate can also be changed (e.g., changed to monitoring rate R3, changed to an increased monitoring rate).

In some embodiments, performance parameter values associated with a first execution cycle can affect a monitoring rate associated with a second execution cycle. For example, performance parameter values during execution cycle EX1 can be used to determine a monitoring rate during execution cycle EX2 based on a performance condition. In some embodiments, the performance parameter values during execution cycle EX1 can be used to determine an initial monitoring rate of the execution cycle EX2, a monitoring rate throughout the execution cycle EX2, and/or so forth. Thus, the monitoring overhead associated with setting up monitoring at the beginning of an execution cycle (and the SQL program P1) can be avoided.

Implementations of the various techniques described herein may be implemented in digital electronic circuitry; or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry (e.g., an FPGA (field programmable gate array) or an ASIC (application-specific integrated circuit)).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory may be supplemented by, or incorporated in special purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser) through which a user can interact with an implementation, or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. An apparatus, comprising:
   at least one processor; and
   at least one memory device comprising instructions stored thereon that, when executed by the at least one processor, are configured to cause the apparatus to implement:
   a monitoring module configured to receive an indicator of initiation of an execution cycle of a main program including a database query program configured to execute a plurality of times during the execution cycle of the main program; and
   a monitoring configuration manager configured to, in response to the received indicator, trigger performance monitoring, by the processor, of multiple executions of the database query program during the execution cycle of the main program,
   the performance monitoring of the multiple executions of the database query program during the execution cycle of the main program including monitoring a first execution of the database query program based on a first monitoring configuration and monitoring a second execution of the database query program based on a second monitoring configuration, the first monitoring configuration being different than the second monitoring configuration,
   the monitoring configuration manager being configured to terminate the performance monitoring of the multiple executions of the database query program during the execution cycle of the main program based on at least one parameter value related to the database query program satisfying a performance condition.

2. The apparatus of claim 1, wherein the monitoring configuration manager is configured to maintain performance monitoring of the multiple executions of database query program during the execution cycle of the main program in response to the performance condition being unsatisfied based on the at least one parameter value related to the database query program.

3. The apparatus of claim 1, wherein the execution cycle of the main program is a first execution cycle of the main program, and
   wherein the monitoring configuration manager is configured to trigger performance monitoring of the database query program during a second execution cycle of the main program, the performance monitoring of the database query program during the second execution cycle having a duration different from a duration of the performance monitoring of the database query program during the first execution cycle.

4. The apparatus of claim 1, wherein the at least one parameter value is related to a first portion of the execution cycle, and wherein the performance monitoring is terminated during a second portion of the execution cycle after the first portion of the execution cycle.

5. The apparatus of claim 1, wherein the at least one parameter value is related to a first portion of the execution cycle,
wherein the performance monitoring is terminated during a second portion of the execution cycle after the first portion of the execution cycle, and
wherein the instructions are further configured to cause the apparatus to implement:
an extrapolation module configured to define at least a second parameter value for the second portion of the execution cycle based on the parameter value related to the first portion of the execution cycle.

6. The apparatus of claim 1, wherein the at least one parameter value is from a plurality of parameter values related to a first portion of the execution cycle,
wherein the performance monitoring is terminated during a second portion of the execution cycle after the first portion of the execution cycle, and
wherein the instructions are further configured to cause the apparatus to implement:
an extrapolation module configured to calculate an extrapolated value for the execution cycle based on less than all of the plurality of parameter values related to the first portion of the execution cycle.

7. The apparatus of claim 1, wherein the performance monitoring is terminated by the monitoring configuration manager in response to the performance condition being satisfied based on a combination of two or more parameter values including the at least one parameter value related to the database query program.

8. A non-transitory computer-readable storage medium storing instructions that when executed cause a processor to:
establish, at a beginning of each of a plurality of execution cycles of a main program including a database query program, a configuration for monitoring executions of the database query program within the execution cycle of the main program,
monitor a first execution of the database query program within the execution cycle of the main program based on the established configuration for monitoring executions of the database query program;
modify, during the execution cycle of the main program, the configuration for monitoring executions of the database query program; and
monitor a second execution of the database query program within the execution cycle of the main program based on the modified configuration for monitoring the database query program.

9. The non-transitory computer-readable storage medium of claim 8, wherein the instructions when executed cause the processor to:
modify the configuration for monitoring executions of the database query program during a first execution cycle from the plurality of execution cycles of the main program at a time within the first execution cycle that is different from a time within a second execution cycle from the plurality of execution cycles for modifying the configuration for monitoring executions of the database query program during the second execution cycle.

10. The non-transitory computer-readable storage medium of claim 8, wherein the database query program is a first database query program from the plurality of database query programs, and wherein the instructions when executed cause the processor to
modify a configuration for monitoring of a second database query program during at least a portion of the plurality of execution cycles of the main program, the modifying associated with the second database query program being based on a first parameter value different from a second parameter value used to trigger the modifying the configuration associated with the first database query program.

11. A method comprising:
receiving, by a computing system, an indicator of initiation of an execution cycle of a main program including a database query program configured to execute a plurality of times during the execution cycle of the main program;
in response to the received indicator, triggering performance monitoring, by a processor, of multiple executions of the database query program during the execution cycle of the main program; and
wherein the performance monitoring of multiple executions of the database query program during the execution cycle of the main program includes monitoring a first execution of the database query program based on a first monitoring configuration and monitoring a second execution of the database query program based on a second monitoring configuration, the first monitoring configuration being different than the second monitoring configuration.

12. The method of claim 11, further comprising, terminating the performance monitoring in response to a performance condition being satisfied based at least one parameter value.

13. The apparatus of claim 1, wherein the at least one parameter value includes a number of timeouts.

14. The apparatus of claim 1, wherein the at least one parameter value includes a number of deadlocks.

15. The apparatus of claim 1, wherein the at least one parameter value includes a central processing unit (CPU) performance value.

16. The apparatus of claim 1, wherein the at least one parameter value includes a number of get page requests.

17. The apparatus of claim 1, wherein the at least one parameter value includes a wait time.

18. The apparatus of claim 1, wherein the performance monitoring of the multiple executions of the database query program during the execution cycle of the main program by the processor includes monitoring at least one of a number of timeouts, a number of deadlocks, a duration of an execution, an execution counter value, an input/output (I/O) time, a central processing unit (CPU) time, a CPU usage, a number of get page requests and a wait time of the database query program.

19. The non-transitory computer-readable storage medium of claim 8, wherein establishing the configuration for monitoring executions of the database query program within the execution cycle of the main program includes execution of a configuration for monitoring at least one of a number of timeouts, a number of deadlocks, a duration of an execution, an execution counter value, an input/output (I/O) time, a central processing unit (CPU) time, a CPU usage, a number of get page requests and a wait time of the database query program.

20. The method of claim 11, wherein triggering performance monitoring of multiple executions of the database query program by the processor includes triggering monitoring of at least one of a number of timeouts, a number of deadlocks, a duration of an execution, an execution counter value, an input/output (I/O) time, a central processing unit (CPU) time, a CPU usage, a number of get page requests and a wait time of the database query program.

* * * * *